United States Patent [19]

Stucke et al.

[11] 4,007,356
[45] Feb. 8, 1977

[54] CARD RETRIEVAL MEANS
[75] Inventors: Arthur W. Stucke, Dayton; Richard P. Taylor, Xenia, both of Ohio
[73] Assignee: NCR Corporation, Dayton, Ohio
[22] Filed: Dec. 10, 1975
[21] Appl. No.: 639,313
[52] U.S. Cl. .............................. 235/61.11 R; 271/3
[51] Int. Cl.² .................... G06K 13/20; B65H 5/22
[58] Field of Search ............ 235/61.11 R, 61.11 A, 235/61.11 C, 61.11 D, 61.11 E, 61.7 B; 271/3, 8, 63

[56] References Cited
UNITED STATES PATENTS

| | | | |
|---|---|---|---|
| 3,662,343 | 5/1972 | Goldstein et al. | 235/61.7 B |
| 3,671,719 | 6/1972 | May | 235/61.11 R |
| 3,697,729 | 10/1972 | Edwards et al. | 235/61.7 B |
| 3,766,687 | 10/1973 | Henson | 235/61.7 B |
| 3,921,969 | 11/1975 | Hickey et al. | 271/3 |

*Primary Examiner*—Daryl W. Cook
*Attorney, Agent, or Firm*—J. T. Cavender; Albert L. Sessler, Jr.

[57] ABSTRACT

A mechanism is devised for acting upon a credit card which is partially ejected from a utilizing machine for complete removal by the customer following a customer controlled transaction. Whtn the customer fails to remove said card within a predetermined time, a timer within the utilizing machine activates mechanism to retrieve the card to a position entirely within the machine, after which the card is directed into a receptacle within the machine.

11 Claims, 6 Drawing Figures

CARD RETRIEVAL MEANS

BACKGROUND OF THE INVENTION

This invention relates generally to apparatus controlled at least in part by encoded record media, and more particularly it relates to a card retrieval mechanism therefor.

A recent development in banking is the use of self-service teller machines by means of which customers can perform many banking functions including deposits, withdrawals and transfer of funds without the presence of a bank teller or other bank employee. These transactions are performed using bank credit cards, each of which has information stored thereon relating to the individual account of the customer. It can readily be seen that the credit card is a key element in this system of self-service or automated banking, and that it is therefore extremely important that adequate precautions be taken against the wrongful possession of a customer's credit card by another person.

One way by which a credit card might come into another party's possession is if the owner of the card forgetfully left it at the machine at the conclusion of the transaction in which he was engaged, and the next person then wrongfully appropriated the card.

SUMMARY OF THE INVENTION

The present invention provides means to prevent wrongful appropriation by another party of a credit card inadvertently left at the machine by its owner by retrieving into the machine any card which has not been claimed within a predetermined period and placing it into a receptacle within the machine. Bank personnel can then remove the card from the receptacle and subsequently return it to its owner.

The invention is shown in the illustrated embodiment as being employed in a mechanism of the type disclosed in U.S. Pat. No. 3,850,299, issued Nov. 26, 1974 to Carl E. Kreitzer, and assigned to the present assignee. However the invention could also be employed in other types of machines in which it was desired to employ a card retrieval function.

According to the invention, a record member transport and capture mechanism for use with a wall with an opening therein to receive a record member comprises first detecting means for detecting the position of a record member partially protruding from said opening; timing means initiated by said first detecting means for timing a predetermined period commencing with the positioning of said record member in said partially protruding position; dual position guide means movable between two positions, in a first of which the record member will pass thereby in a normal path of movement, and in a second of which the card will be deflected from its normal path of movement; first driving means for driving a record member inserted through the opening to a second position, and from said second position to said partially protruding position, with the guide means in said first position; second driving means for driving said record member from said partially protruding position to an intermediate position; operating means capable of assuming a first state for operating said second driving means to drive said record member to said intermediate position in response to said record member remaining in said partially protruding position without being removed by a customer for a time in excess of said predetermined period, and also for positioning said guide means so that the record member is driven in its normal path of movement; second detecting means for detecting when said record member has been driven into said intermediate position; and means responsive to said second detecting means for operating said first drive means to drive said card toward said guide means and for causing said operating means to assume a second state to position said guide means to cause said card to be deflected from its normal path of movement.

It is accordingly an object of the present invention to provide, in a customer credit card controlled machine, means for retrieving a card to an inaccessible position if not taken by the customer within a predetermined period following conclusion of a machine transaction.

Another object is to provide a record member transport and capture mechanism capable of transporting a record member to an exposed position and of subsequently retrieving said record member if not removed from said position by other means within a predetermined period of time.

A further object is to provide a record member transport and capture mechanism having primary transporting means and selectively operable secondary transporting means.

With these and other objects, which will become apparent from the following description, in view, the invention includes certain novel features of construction and combinations of parts, one form or embodiment of which is hereinafter described with reference to the drawings which accompany and form a part of this specification.

DESCRIPTION OF THE PREFERRED EMBODIMENT

Figure 1:
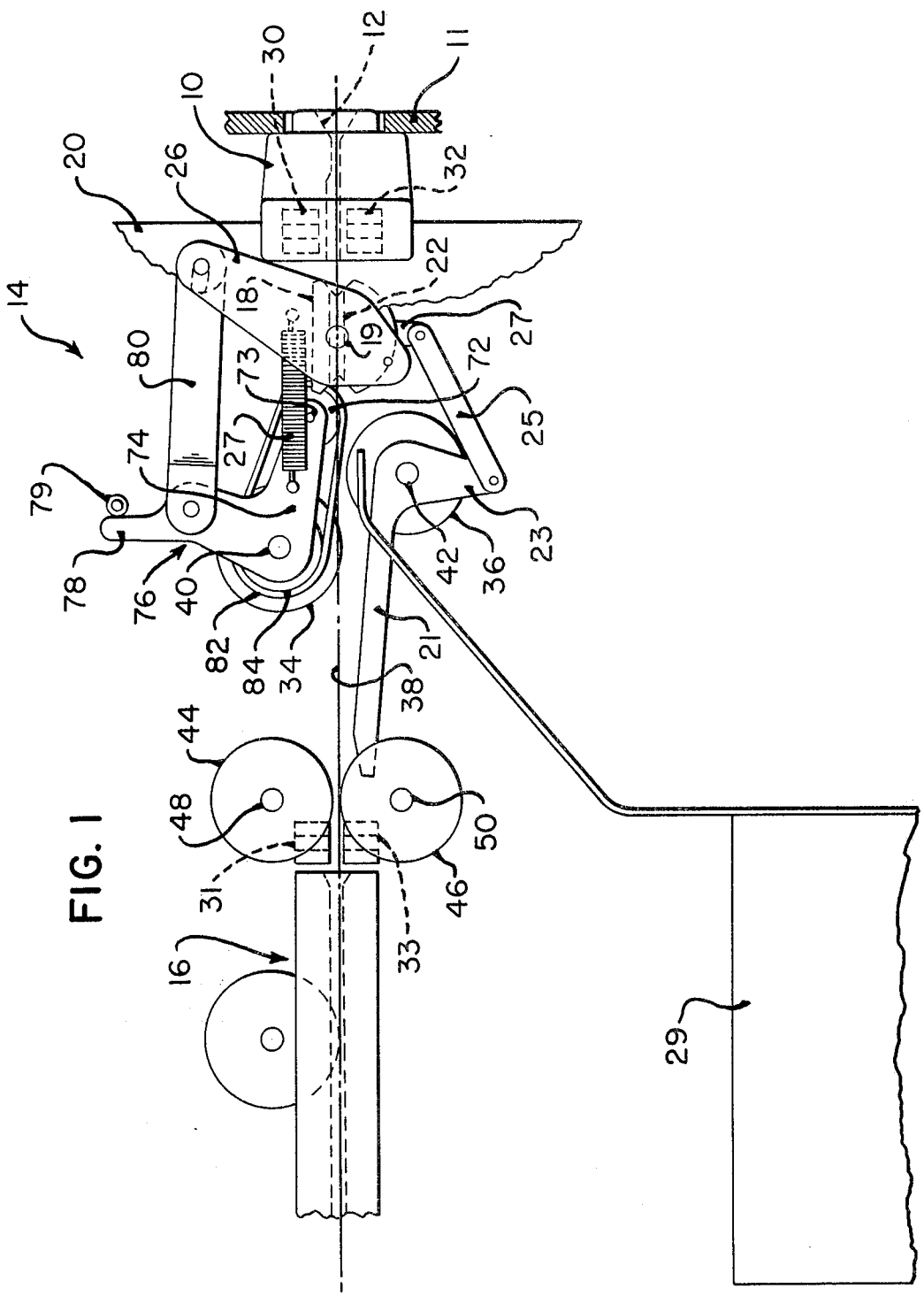
FIG. 1 is a side view, in elevation, with the mechanism partially broken away, of this invention as it is positioned in a business machine, showing a guide means, card transport means, a portion of a card reader-recorder, retrieval means for retrieving a credit card from an exposed position in which it is profferred to its owner, and a collection box for storing cards which are retained within the machine.
Figure 2:
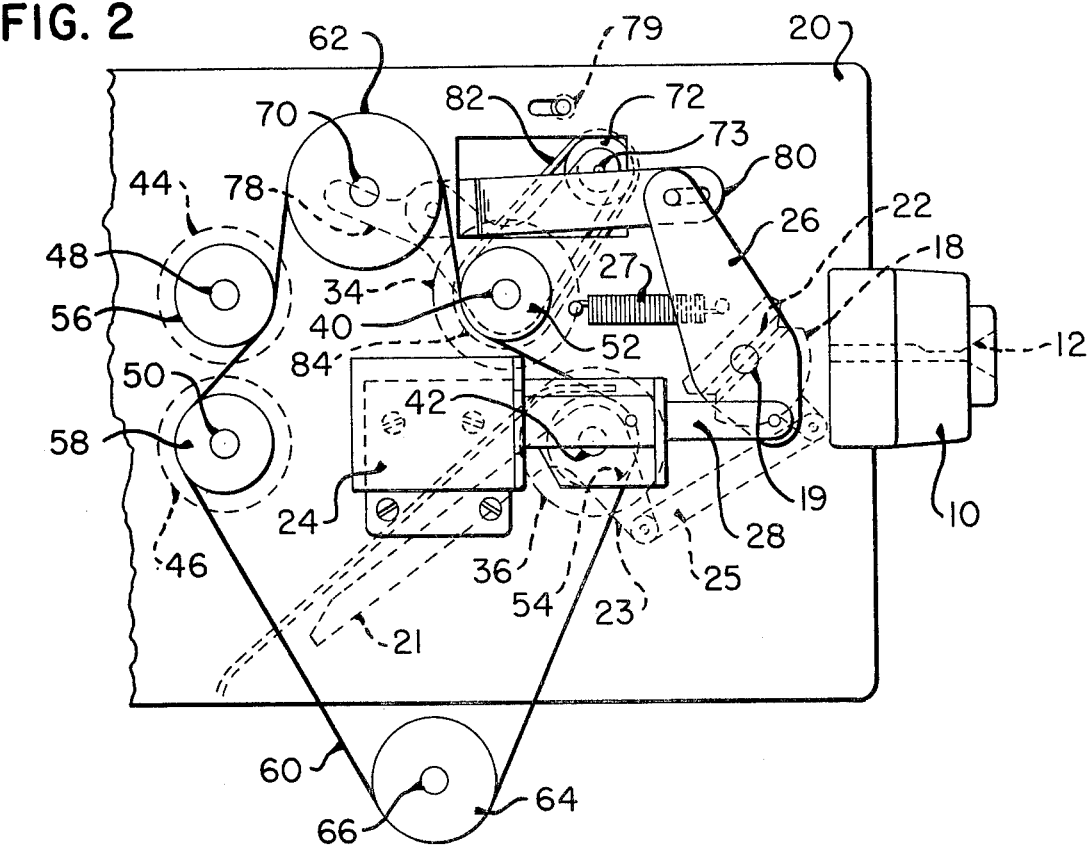
FIG. 2 is a partial side view, in elevation, similar to FIG. 1, with the guide member and the retrieval means shifted to a second position.

Referring now to the mechanism shown in FIGS. 1 and 2, it may be noted that this is quite similar to the corresponding mechanism shown and described in the previously-mentioned U.S. Pat. No. 3,850,299, and reference to that patent may be had for a more detailed description of the mechanism, and its relationship to other portions of the machine in which it is used.

The machine includes a card entry guide 10 in a machine cabinet wall 11, having a slot 12 therein to enable a user or customer to insert his or her token or credit card into the machine. The card transport and capture mechanism, designated generally as 14, is positioned between the slot 12 and a utilization means such as a card reader or reader-recorder designated generally as 16.

The mechanism 14 includes a guide member 18 fixed to a shaft 19 which is pivotally mounted in side frames 20. The guide member 18 is generally cylindrical in shape and has an elongated slot 22 therein. The guide member is rotated between a first position shown in FIG. 2 and a second position shown in FIG. 1 by a drive means which may be a solenoid 24 (FIG. 2) driving a lever 26 fixed to the shaft 19, through a link 28. The lever 26 is normally urged in a counterclockwise direction as viewed in FIG. 1 by a spring 27 connected between said lever and the side frame 20. When the guide member 18 is in the position shown in FIG. 2, the associated slot 22 is misaligned with the slot 12 in the card entry guide 10, and when the guide member 18 is in the position shown in FIG. 1, its slot 22 is aligned with the slot 12 in the entry guide 10.

Operating simultaneously and in conjunction with the guide member 18 is a guide bar 21 which forms part of a lever 23 pivoted on a shaft 42 and connected by a link 25 to an extension 27 on the guide member 18. When the guide member 18 is in the position shown in FIG. 1, the bar 21 is maintained in a generally horizontal position and restrains a card being transported through the mechanism 14 from dropping into a receptacle 29, from which it cannot be retrieved by a customer. However when the guide member 18 is in the position shown in FIG. 2, the guide bar 21 is shifted to an inclined position which permits a card to drop by force of gravity into the receptacle 29.

Figure 3:
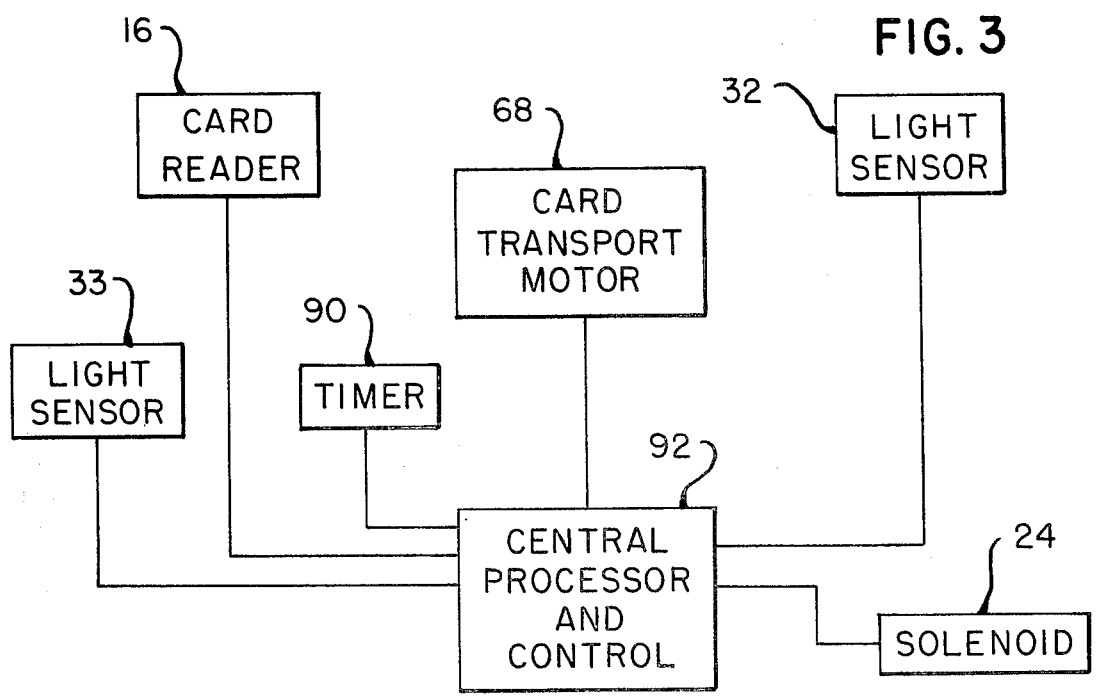
FIG. 3 is a general schematic view of a control means which may be used with the invention.

When the guide member 18 is in the first position (FIG. 2), one of its functions is to prevent foreign objects from being inserted into the machine by blocking the path to the interior of the mechanism 14. When a user of the machine inserts a correct card into the slot 12, sensors located at the extremities of the slot detect the presence of the correctly sized card and actuate the solenoid 24 (through the control means of FIG. 3) to rotate the guide member 18 to the position in which it is shown in FIG. 1.

The sensors, which may be conventional, include a light emitter 30 and a light sensor 32 which are located in opposed relation (as shown in FIG. 1) on each side of the slot 12. When a card having the correct dimensions is introduced into the slot 12 with the correct orientation, the sensors 32 are energized and the control means shown in FIG. 3 energizes the solenoid 24 to rotate the guide member 18 to the position in which it is shown in FIG. 1, enabling the card to be inserted further into the mechanism 14.

Similar sensors, each consisting of a light emitter 31 and a light sensor 33, are placed at either side of the card path adjacent to the card reader 16, for a purpose which will be subsequently described.

After insertion into the mechanism 14, said card is received by transport means comprising first and second feed means, with the first feed means being located adjacent to the guide member 18 and the second feed means being located downstream from the first feed means when considering the direction of travel of a card from the slot 12 to the card reader 16.

The first feed means includes a first roller 34 and a second set of rollers 36 located on opposed sides of a feed line 38 extending through the slot 12 to the card reader 16. Roller 34 is fixed to a shaft 40 and rollers 36 are fixed to the shaft 42, both shafts being rotatably mounted in the side frames 20. Roller 34 cooperates with one of the rollers 36, while the other roller 36 cooperates with an additional feed means, as will be subsequently described.

The second feed means includes first and second sets of cooperating rollers 44, 46 located on opposed sides of the feed line 38, and fixed to shafts 48, 50, respectively, which are rotatably mounted in the side frames 20.

The drive means for drivingly rotating the rollers of the first and second feed means so as to transport a card includes a plurality of pulleys 52, 54, 56, 58 (FIG. 2) fixed to the shafts 40, 42, 48, 50, respectively. A belt 60 engages these pulleys, as well as an idler pulley 62 and a driving pulley 64 driven through a shaft 66 by a reversible card transport motor 68 shown diagrammatically in FIG. 3. The idler pulley 62 is mounted on a suitable stub shaft 70 fixed to a side frame 20, while the motor 68 is mounted in the machine framework. When the pulley 64 is driven in a clockwise direction, the rollers of the first and second feed means will move a card from the card reader 16 toward the guide member 18, and when the pulley 64 is driven in a counterclockwise direction, said feed means will move a card from the guide member 18 toward the card reader 16.

For a more detailed discussion of the manner in which the first and second feed means function to transport a card to and from the card reader in accordance with controls exercised by the machine in which the mechanism 14 is employed, reference may be had to the previously mentioned U.S. Pat. No. 3,850,299.

Figure 4:
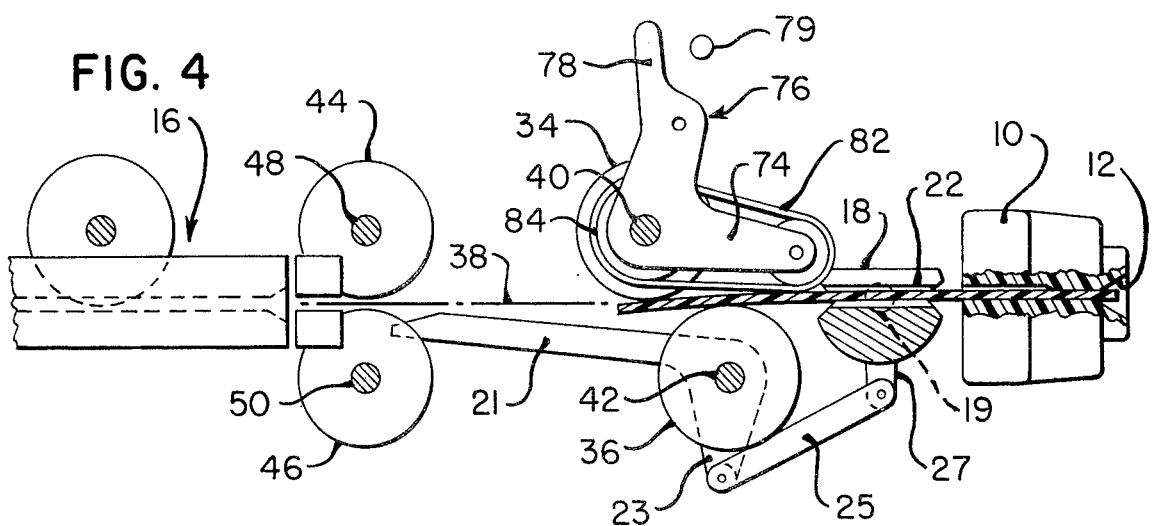
FIG. 4 is a diagrammatic view showing a portion of the record member transport and capture mechanism with the record member in a position to be removed by its owner.
Figure 5:
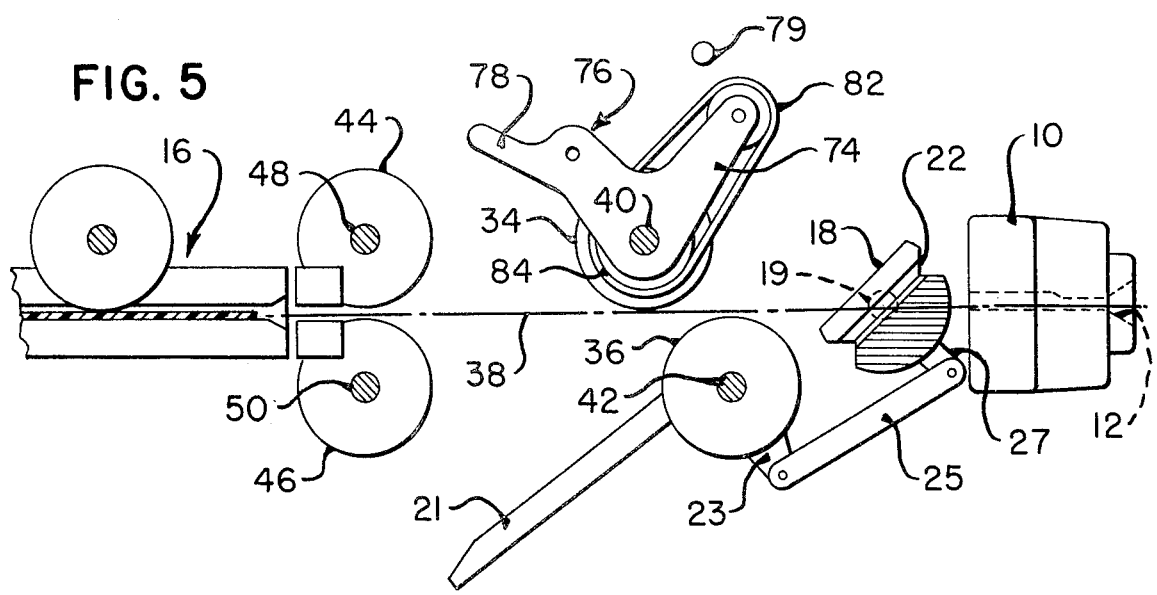
FIG. 5 is a diagrammatic view showing a portion of the record member transport and capture mechanism with the record member positioned within the reader-recorder.

Also included in the present invention is an additional feed means for shifting a card to the left from the position in which it is shown in FIG. 4. Such feed means may take any appropriate form. In the illustrated embodiment, it includes a pulley 72 rotatably mounted on a shaft 73 fixed to one arm 74 of a lever 76, which is rotatably mounted on the shaft 40. A second arm 78 of the lever 76 is connected by a link 80 to the arm 26 which, it will be recalled, is shiftable by the solenoid 24. Movement of the lever 76 in one direction is limited by a stop 79 adjustably secured to one side frame 20, abutting the arm 78. A belt 82 engages the pulley 72 and also engages a one-way clutch 84 fixed to the shaft 40. The one-way clutch 84 is designed so that the belt 82 is driven in a counterclockwise direction when the shaft 40 is driven correspondingly, to move a card to the left as viewed in FIG. 1, but is not driven when the shaft 40 is driven in a clockwise direction. The belt 82 is positioned on the pulley 72 and the clutch 84 so that when the solenoid 24 is energized, the outside surface of the belt will engage the upper surface of an appropriately positioned card, and cause said card to be driven in the direction of the card reader 16.

The mode of operation of the mechanism of the present invention will now be described with particular reference to FIGS. 3 to 6 inclusive. Let it be assumed for purposes of illustration that a normal use of the credit card in the machine has taken place, in which the card has been driven from the position of FIG. 4 to the position of FIG. 5 for reading and/or recording, by the card reader 16, and that the credit card has been returned by the transport mechanism 14 to the position shown in FIG. 4, in which the end of the card protrudes from the slot 12 in the card entry guide 10, from which it may be retrieved by the owner of the card.

At the time that the card is shifted to the right into the position shown in FIG. 4, it interrupts the path of light impinging upon the light sensor 32 from the light emitter 30. This is effective, by means of the control system shown in FIG. 3, to start the timer 90 in a timing cycle of predetermined duration, which may, for example, be two minutes, though any reasonable duration may be selected.

If, within the given time period, the owner removes the card, the light path to the sensor 32 is re-established and no further action takes place. However if the card is not removed within the prescribed time duration, a signal is sent from the timer 90 to the central processor and control 92, which causes the solenoid 24 to be energized and the motor 68 to be operated to rotate the shaft 66 in a counterclockwise direction.

Figure 6:
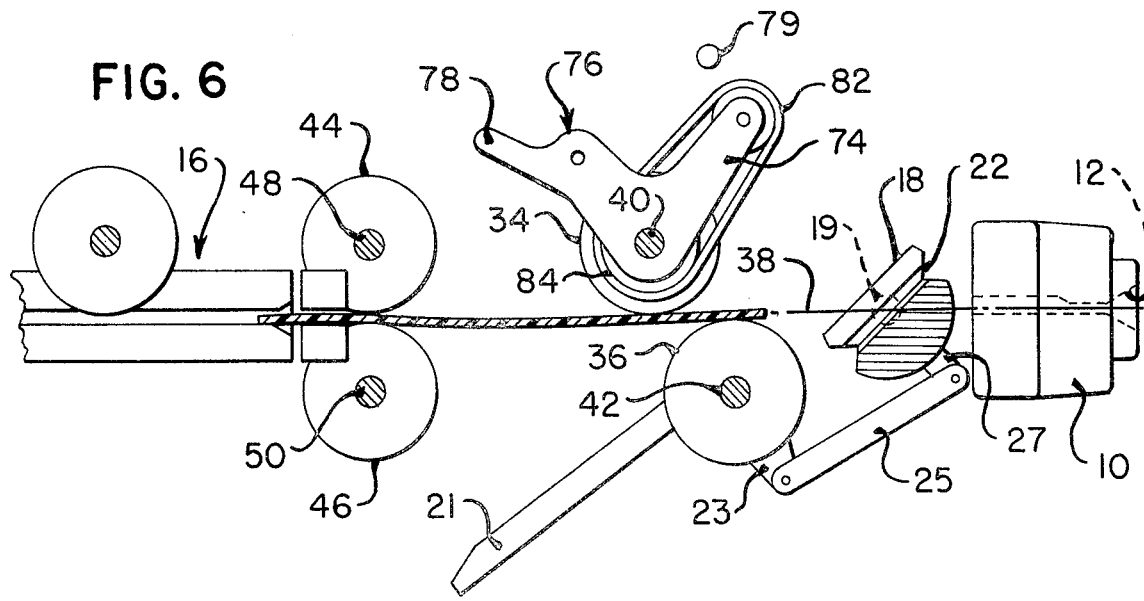
FIG. 6 is a diagrammatic view showing a portion of the record member transport and capture mechanism with the record member in an intermediate position.

It will be noted that the guide member 18 has been held in the position of FIG. 1 even though the solenoid 24 has not been energized, due to the fact that the credit card extends through both the slot 22 in the member 18 and the slot 12 in the entry guide 10. Energization of the solenoid 24 shifts the guide member 18 slightly so that it is no longer held by the card, and energization of the solenoid 24 also causes the belt 82 to press firmly against the upper surface of the card so that rotation of said belt by operation of the motor 80 in a counterclockwise direction shifts the credit card to the left as viewed in FIG. 4. As the card moves to the left, the sensor 32 is unblocked, causing the solenoid 24 to deenergize, lifting the belt 82 from the card surface, and shifting the guide member 18 and the guide bar 21 to the position shown in FIG. 6. However by this time, the card has been picked up by the cooperating rollers 34, 36, and then by the rollers 44, 46. The card is thus fed to the position in which it is shown in FIG. 6, in which the light impinging upon the light sensor 33 adjacent to the card reader 15 is blocked by the card. This sends a signal to the central processor and control 92 (FIG. 3), which causes the motor 68 to reverse direction, so that the card is now fed to the right. Since the guide member 18 is in the tilted position shown in FIG. 6, the card rides up on the upper surface of the guide member until the card's trailing edge clears the cooperating rollers 44, 46, at which time it is caused by the force of gravity to drop down upon the guide bar 21, by which it is guided into the receptacle 29.

It may be noted that the one-way clutch 84 is employed so that the card is driven by the belt 82 only to the left. If the belt 82 were also operable to drive the card to the right, the card would be driven sufficiently far out through the slot 12 that it could not be retrieved in the event that it was not recovered by its owner within the prescribed period.

While the form of the invention illustrated and described herein is particularly adapted to fulfill the objects aforesaid, it is to be understood that other and further modifications within the scope of the following claims may be made without departing from the spirit of the invention.

What is claimed is:

1. A record member transport and capture mechanism for use with a wall with an opening therein to receive a record member, comprising:

first detecting means for detecting the position of a record member partially protruding from said opening;

timing means initiated by said first detecting means for timing a predetermined period commencing with the positioning of said record member in said partially protruding position;

guide means movable between two positions, in a first of which the record member will pass thereby in a normal path of movement, and in a second of which the card will be deflected from its normal path of movement;

first driving means for driving a record member inserted through the opening to a second position, and from said second position to said partially protruding position, with the guide means in said first position;

second driving means for driving said record member from said partially protruding position to an intermediate position;

operating means for operating said second driving means to drive said record member to said intermediate position in response to said record member remaining in said partially protruding position without being removed by a customer for a time in excess of said predetermined period, and also for positioning said guide means so that the record member is driven in its normal path of movement;

second detecting means for detecting when said record member has been driven into said intermediate position; and means responsive to said second detecting means for operating said first drive means to drive said record member toward said guide means and for causing said operating means to position said guide means to cause said record member to be deflected from its normal path of movement.

2. The record member transport and capture mechanism of claim 1 in which said second driving means is moved into and out of operative relation to the record member by said operating means.

3. The record member transport and capture mechanism of claim 2 in which said second driving means includes an endless belt engageable with the record member for driving it.

4. The record member transport and capture mechanism of claim 3 in which said second driving means is driven in one direction only.

5. The record member transport and capture mechanism of claim 3 in which said second driving means includes a one-way clutch means.

6. A card transport and capture mechanism for use with a cabinet having an end wall with an opening therein to receive a card, comprising:

first detecting means for detecting the position of a card partially protruding from said opening, for removal by the card owner;

timing means initiated by said first detecting means for timing a predetermined period commencing with the positioning of said card in said partially protruding position;

dual position guide means movable between two positions, in a first of which the card will pass thereby in a normal path of movement, and in a second of which the card will be deflected from its normal path of movement;

first driving means for driving a card inserted into the cabinet to a second position, and from said second position to said partially protruding position, with the guide means in said first position;

second driving means for driving said card from said partially protruding position to an intermediate position;

operating means energizable for operating said second driving means to drive said card to said intermediate position in response to a signal from said timing means indicating that said card has remained in said partially protruding position in excess of said predetermined period, and also for positioning said guide means so that the card is driven in its normal path of movement;

second detecting means for detecting when said card has been driven into said intermedite position; and means responsive to said second detecting means for operating said first drive means to drive said card toward said guide means and for deenergizing said operating means to position said guide means to cause said card to be deflected from its normal path of movement, whereby it will be retained within said cabinet.

7. A card transport and capture mechanism for use with a cabinet having an end wall with an opening therein to receive a card, comprising:

first detecting means for detecting the position of a card partially protruding from said opening, for removal by the card owner;

timing means initiated by said first detecting means for timing a predetermined period commencing with the positioning of said card in said partially protruding position;

a receptacle into which captured cards will pass;

dual position guide means movable between two positions, in a first of which the card will pass thereby in a normal path of movement, and in a second of which the card will be deflected from its normal path of movement for movement into said receptacle;

first driving means for driving a card inserted into the cabinet to a second position, and from said second position to said partially protruding position, with the guide means in said first position;

second driving means for driving said card from said partially protruding position to an intermediate positon;

bi-directional motor means for driving said first and second drive means;

operating means operable when energized to position said guide means so that the card is driven in its normal path of movement, and to position said second drive means to drive said card from said partially protruding position to an intermediate position;

second detecting means for detecting when said card has been driven into said intermediate position; and control means for controlling said bi-directional motor means and said control means;

whereby said control means is controlled by said timing means after the passing of said predetermined period to initiate operation of said motor means and to energize said operating means to cause said second drive means and said first drive means to drive said card from said partially protruding position to said intermediate position, and whereby when said card reaches said intermediate position, said second detecting means causes said control means (1) to deenergize said operating means to cause shifting of the dual position guide means into its second position and (2) to reverse the direction of operation of the motor means, causing said card to be driven towards the guide means and thence to be deflected for movement into said receptacle.

8. The card transport and capture mechanism of claim 7 in which said second driving means is moved into and out of operative relation to the card by said operating means.

9. The card transport and capture mechanism of claim 8 in which said second driving means includes an endless belt engageable with the card for driving it.

10. The card transport and capture mechanism of claim 9 in which said second driving means is driven in one direction only.

11. The card transport and capture mechanism of claim 9 in which said second driving means includes a one-way clutch means.

* * * * *